Nov. 14, 1961     A. MARTIN     3,008,598
RIVET NUT TOOL
Filed Sept. 28, 1960     2 Sheets-Sheet 1
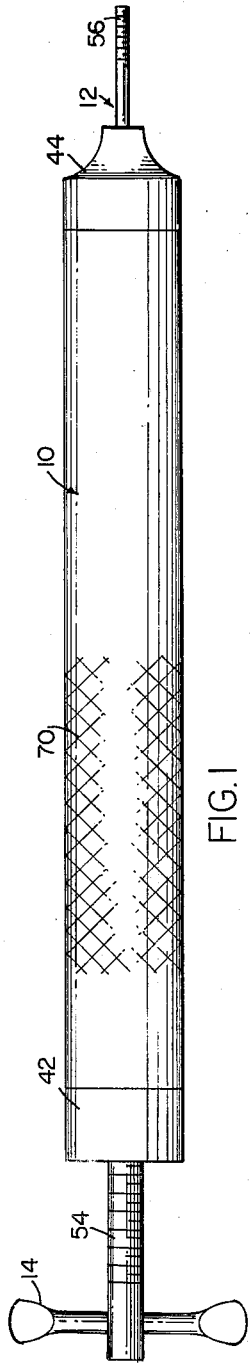
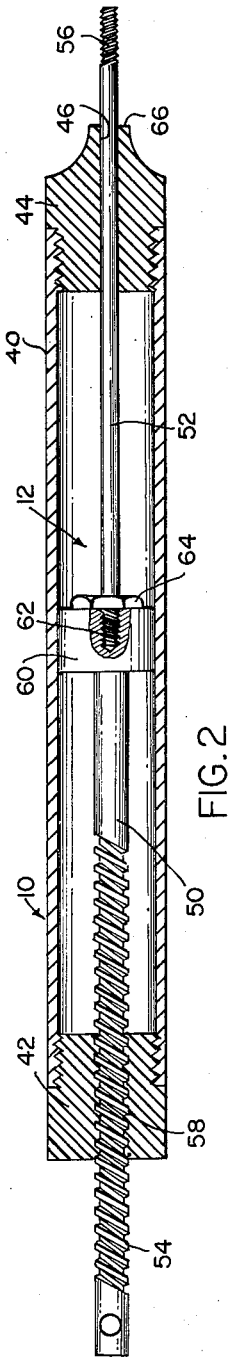
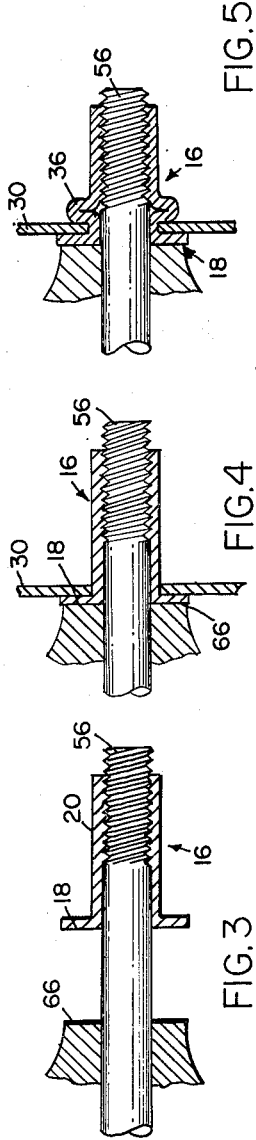
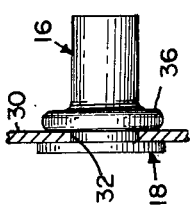
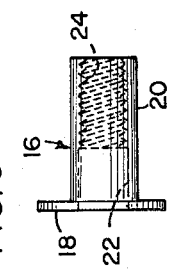
INVENTOR.
ALAN MARTIN
BY
ATTORNEYS

INVENTOR.
ALAN MARTIN ation between the shaft section 52 and the boss 60. When the shaft section 52 is to be replaced by another of different size, as will be explained below, the nut 64 is loosened and the section 52 unscrewed from the boss 60. The new section is then screwed into the boss 60 and the nut 64 tightened against the boss to hold the new section in place.

United States Patent Office
3,008,598
Patented Nov. 14, 1961

3,008,598
RIVET NUT TOOL
Alan Martin, Grant Circle, Sharon, Mass.
Filed Sept. 28, 1960, Ser. No. 59,054
8 Claims. (Cl. 218—43)

This invention relates to a tool for mounting internally threaded rivets in sheet material.

Internally threaded rivets, hereinafter called rivet nuts, are finding an ever increasing number of uses as they are a most practical and convenient type of fastener. Rivet nuts are normally fabricated from soft metal stock such as aluminum and are provided with a flange at one end that forms the rivet head. The head cooperates with a crimp formed in the body of the fastener at the time of installation to hold it on the sheet to which it is secured. The head at one end lies on one side of the sheet while the crimp lies on the other side of the sheet to hold it in place. So installed, the fastener readily receives a screw which may be used to attach almost any article to the sheet.

While rivet nuts are most often used in the fabrication of mass produced items and are therefore normally installed automatically by power equipment in the articles in which they are incorporated, their increasing number of uses has required the development of small, portable and relatively inexpensive tools for forming the crimps in the rivet nuts so they may be mounted easily and conveniently at virtually any location. While different tools have been devised which are portable and which may be operated easily to mount the rivet nuts in place, these tools are relatively expensive.

The primary object of my invention is to provide an inexpensive tool for mounting rivet nuts.

Another object of my invention is to provide a tool for mounting rivet nuts, which is lightweight and compact so that it may be conveniently carried.

To accomplish these and other objects, the tool invented by me includes a sleeve through which extends a two-sectioned shaft threaded at its ends. An important feature of this invention resides in the fact that these threads are oppositely turned, for reasons which will become apparent below. One of the threaded ends of the shaft registers with an internally threaded collar secured to one end of the sleeve, which causes the shaft to move axially as the shaft rotates. The other end of the shaft is guided and supported for axial movement by a second collar at that end of the sleeve, which collar is provided with a smooth inner surface of a diameter just large enough to accommodate that end of the shaft. The threads on that end of the shaft lie beyond the collar. When the shaft is rotated, the threads beyond the collar will screw into a rivet nut and continued turning of the shaft will cause the head of the rivet nut to engage the outer surface of the collar at that end of the sleeve. Further rotation of the shaft will cause the portion of the rivet nut lying just outside the head to crimp or spread outwardly. If the rivet nut is disposed in a hole formed in a sheet during these operations, the crimp will form on the side of the sheet opposite to that engaged by the head. To remove the threaded end of the tool from the rivet nut, the user need only rotate the shaft in the opposite direction.

The section of the shaft bearing the threads which register with the internally threaded boss to move the shaft axially is of substantially larger diameter than the other shaft section. As the two sections of the shaft are detachable, the section that screws into the rivet nut may be replaced by another section of different diameter to facilitate use of the tool with rivet nuts of different size.

These and other objects and features of my invention will be better understood and appreciated from the following detailed description of two embodiments thereof, selected for purposes of illustration and shown in the accompanying drawing in which:

FIGURE 1 is a plan view of a rivet nut tool constructed in accordance with my invention;

FIGURE 2 is a cross sectional view of the tool shown in FIGURE 1;

FIGURES 3, 4 and 5 are enlarged detailed views, partly in section, illustrating the manner in which the tool crimps the rivet nut;

FIGURE 6 is a plan view of a typical rivet nut handled by the tool;

FIGURE 7 is a plan view illustrating the manner in which the rivet nut is mounted in a piece of sheet material.

Figure 8:
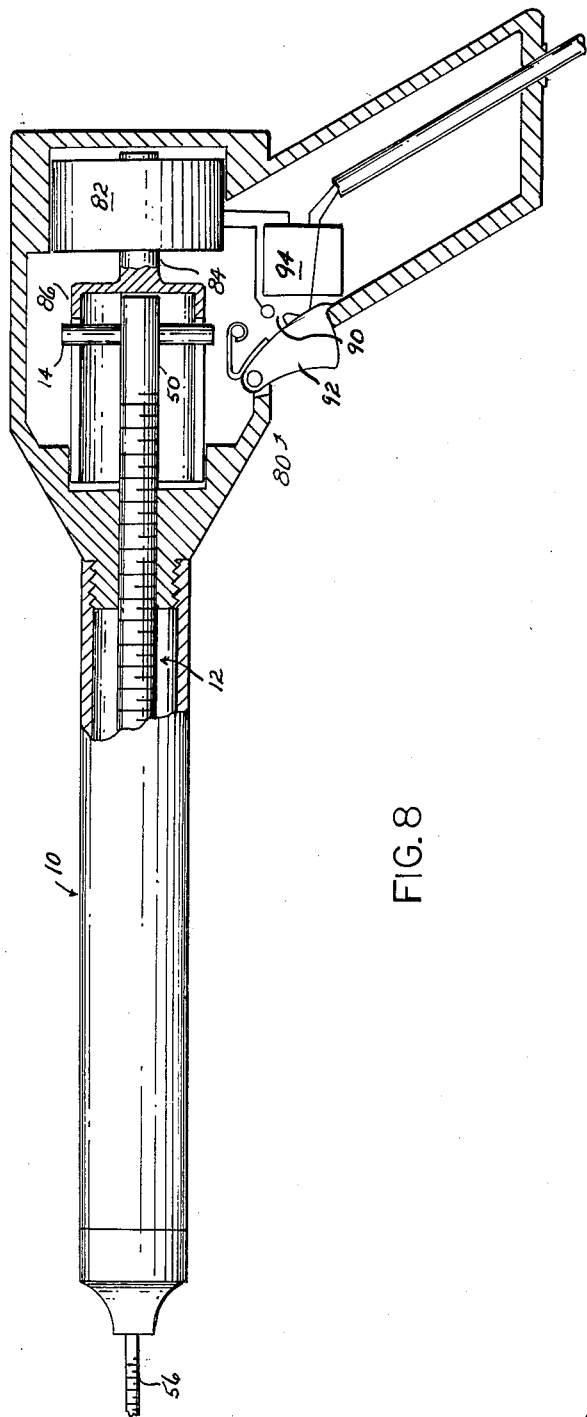
FIGURE 8 is a plan view, partly in section of an electrically operated rivet nut tool constructed in accordance with my invention.

The embodiment of my invention shown in FIGURES 1–5 includes a case 10, a shaft 12, and a handle 14. The tool is capable of receiving a rivet nut of the type shown in FIGURE 6 and mounting it in a sheet of material in the manner shown in FIGURE 7.

Before describing the details of the tool, the rivet nut and its applications will be described. In FIGURE 6, a rivet nut 16 is illustrated having an outwardly extending flange 18 formed at one end which serves as the head of the rivet nut. The body 20 of the rivet nut is cylindrical in shape and its central bore or opening 22 extends axially through the body 20 and the head 18. A portion of the opening 22 is threaded as suggested at 24. It will be noted in FIGURE 6 that the diameter of the threaded portion of the opening 22 is somewhat smaller than the diameter of the unthreaded portion so that the end of the body nearer the head has a relatively weak wall.

In use, the rivet nut 16 is secured in an opening provided in the sheet of material to which it is to be fastened. In FIGURE 7, the sheet 30 which may be made of any material is provided with an opening 32 through which the body 20 of the rivet extends. The head 18 of the rivet nut lies against one face of the sheet and the body 20 is crimped at its relatively weak portion as suggested at 36 against the other face of the sheet to hold the rivet nut in place. The rivet nut 16 is permanently deformed into the shape shown in FIGURE 7 and, therefore, cannot be removed from the sheet unless it is again straightened or the sheet 30 torn or broken. When the rivet nut is mounted on the sheet, a screw having threads which mate with the threads 24 may be screwed into the rivet nut to fasten substantially anything to the sheet 30.

Having described the rivet nut in detail, I shall now describe the tool which I have invented to facilitate the installation of the rivet nut in the manner shown in FIGURE 7. The case 10 is composed of a sleeve 40 closed at one end by an internally threaded collar 42 and at its other end by a second collar 44 having a smooth axial opening 46 extending through it. The shaft 12 is made up of two coaxially aligned and connected sections 50 and 52, the opposite ends of which are threaded as suggested at 54 and 56. The section 50 which is of considerable greater diameter than the section 52 is provided with heavy threads 54 which register with the internal threads 58 formed in the collar 42. The heavy threads 54 may be rectangular in shape to provide the maximum force in moving the shaft 12 axially when a load is applied to the threads 56 at the other end. The section 52 of shaft 12 is connected to the boss 60 formed at the right end of section 50 (as viewed in FIGURE 2) by means of the threads 62 formed at its left end which register with a threaded opening in the boss. A nut 64 firmly locks the shaft section 52 in place and prevents relative rotation of the section 52 with respect to the shaft section 50.

The threads 56 formed on the free end of the section 52 of shaft 12 are oppositely directed to the threads 54 on the section 50. Thus, as shown in FIGURE 3, the shaft 12 has right hand threads 56 and left hand threads 54.

From the foregoing description it will be recognized that when the handle 14 provided on the free end of section 50 of the shaft is turned in a clockwise direction, the shaft 12 will move axially in the case 10 to the left. In use, an operator will hold a rivet nut on the end of the threads 56 of the section 52 and turn the handle 14 clockwise and this will cause the threaded portion 56 to take up the rivet nut 16 to the position shown in FIGURE 3. Continued turning of the shaft 12 will move the rivet nut and the shaft to the left as viewed in the drawings until the head 18 engages the face 66 of the collar 44. When the rivet nut reaches that position on the tool, the operator may then conveniently insert the rivet nut through the opening 32 in the sheet material 30 as suggested in FIGURE 4.

I have pointed out above that in FIGURE 6 the threaded portion 24 of the body 20 of the rivet nut is heavier than the unthreaded portion of the body adjacent the head 18. This characteristic of the rivet nut is important as it causes the rivet nut to crimp in the desired manner when compressive forces are applied to the ends of the rivet nut. Thus, after the rivet nut is inserted through the wall 30 in the manner shown in FIGURE 4, and the shaft 12 is further turned in the clockwise direction, the threads 56 which register with the threads 24 in the rivet nut will pull the threaded end of the rivet nut toward the wall 30 to form the crimp 36 shown in FIGURES 5 and 7. To expedite this operation, a handle of any convenient shape may be formed on the body or frame 10. It is of course necessary to resist rotation of the frame 10 after the head 18 has engaged the surface 66 of the collar 44 which serves as a stop. In FIGURE 1 a knurled section 70 on the sleeve 40 is shown for this purpose. Obviously a handle of any shape may be formed as a part of the case 10 to facilitate gripping of the case to resist rotation.

Having described in detail the illustrated embodiment of my invention, numerous advantages will occur to those skilled in the art. For example, my tool may be easily disassembled for repair whenever necessary. The nature of the tool permits the rivet nut to be threaded on to the end of the shaft 12 and thereafter crimped in the material to which it is to be mounted by one continuous operation of rotating the shaft. The simplicity of the device enables an operator to change the shaft section 52 if a different sized rivet nut is to be used. To remove the section 52 from the boss 60 it is only necessary to loosen the nut 64 and turn the section 52 after withdrawing the shaft 12 from the frame by removing the collar 42 from the sleeve 40. The operator may readily secure a different sized shaft section in place of that shown and by changing the boss 44 for another boss having a bore conforming to the diameter of the new shaft section, the tool may readily be reassembled. The boss 60 of course adds rigidity to the assembly by guiding the axial movement of the shaft within the sleeve 40 of the frame.

While the tool shown in FIGURES 1–5 is manually operated, most of the tool assembly may be incorporated into and form part of a power operated rivet nut tool. Such a tool is shown in FIGURE 8. In that figure, the case 10 and shaft 12 are joined to a pistol-shaped handle 80. The handle 80 contains a reversible motor 82 having an armature 84 which drives a collar 86 longitudinal slotted on opposite sides to accommodate the handle 14 secured to the section 50 of the shaft. When the motor 82 rotates, the rollar 86 will cause the shaft 12 to move axially in a direction determined by the direction of rotation of the motor.

The motor 82 is energized by the closing of switch 90 actuated by the trigger 92. Box 94 represents a reversing mechanism which causes the motor 82 to reverse direction of rotation each time the motor is energized.

It will be apparent that the threaded end 56 of shaft 12 engages and crimps the body of the rivet in precisely the same manner as the same parts in the manually operated tool of FIGURES 1–5. Once mounted, the operator merely releases and immediately thereafter pulls the trigger 92 of the tool to unscrew the shaft 12 from the rivet nut.

Having described my invention in detail, those skilled in the art will appreciate that numerous modifications may be made of it without departing from the spirit of my invention. Therefore, it is not my intention to limit the breadth of my invention to the embodiments illustrated and described. Rather, it is my intention that the scope of this invention be determined by the appended claims and their equivalents.

What is claimed is:

1. A rivet nut tool comprising a shaft, a sleeve surrounding the shaft, oppositely directed threads formed at opposite ends of the shaft, an internally threaded collar secured to one end of the sleeve and registering with the threads on one end of the shaft, and a second collar secured to the other end of the sleeve and having a smooth inner surface, said shaft having a smooth surface intermediate its ends which extends through the opening in the second collar.

2. A rivet nut tool comprising a sleeve, a shaft extending through the sleeve and with its ends lying beyond the ends of the sleeve, a threaded section formed on one end of the shaft, a collar secured to the adjacent end of the sleeve and registering with the threaded section, an oppositely threaded section formed on the other end of the shaft and adapted to be screwed into a rivet nut, said oppositely threaded section lying beyond that adjacent end of the sleeve, and a stop formed on that adjacent end of the sleeve for preventing a rivet nut on said oppositely threaded section from entering the sleeve when the shaft moves axially toward the other end of the sleeve in response to rotation of the shaft.

3. A rivet nut tool comprising a shaft, a sleeve surrounding the central portion of the shaft, means formed on one end of the shaft causing said shaft to move axially in the sleeve in response to rotation of the shaft, threads formed on the other end of the shaft adapted to screw into a rivet nut when the shaft is turned in a direction causing the shaft to move axially away from said threaded end, and a stop secured to the sleeve for preventing axial movement into the sleeve of a rivet nut on the threads.

4. A rivet nut tool as defined in claim 3 further characterized by said means including a collar secured to the sleeve having internal threads which are threaded on to a second threaded portion on the shaft at said one end of the shaft.

5. A rivet nut tool as defined in claim 4 further characterized by the diameter of the threaded portion on said one end of the shaft being substantially greater than the diameter of the threads formed on said other end of the shaft.

6. A rivet nut tool comprising a shaft made up of first and second shaft sections connected together with the first section having a diameter substantially greater than the diameter of the second section, a sleeve surrounding the central portion of the shaft including the connection of the two shaft sections, means formed on the shaft causing said shaft to move axially in the sleeve in response to rotation of the shaft, threads formed on the free end of the second shaft section and adapted to screw into a rivet nut when the shaft is turned in a direction causing the shaft to move axially in the direction of the first section, and a stop secured to the sleeve and preventing axial movement into the sleeve of a rivet nut on the threads.

7. A rivet nut tool as defined in claim 6 wherein the means causing said shaft to move axially includes an internally threaded collar secured to the sleeve and threads formed on the first section of the shaft registering with the threads formed in the collar.

8. A rivet nut tool comprising a shaft, a sleeve surrounding the shaft, means formed on the shaft causing said shaft to move axially in the sleeve in response to rotation of the shaft, threads formed on an end of the shaft adapted to screw into a rivet nut when the shaft is turned in a direction causing the shaft to move axially away from said threaded end, and a stop secured to the sleeve for preventing axial movement into the sleeve of a rivet nut on the threads.

References Cited in the file of this patent

UNITED STATES PATENTS

| | | |
|---|---|---|
| 681,089 | White | Aug. 20, 1901 |
| 2,069,907 | Waner | Feb. 9, 1937 |
| 2,403,262 | Colley | July 2, 1946 |
| 2,562,419 | Ferris | July 31, 1951 |
| 2,641,378 | Wilt | June 9, 1953 |